Patented May 3, 1949

2,468,978

UNITED STATES PATENT OFFICE 2,468,978

COMPOSITION OF MATTER COMPRISING CARBON BLACK AND ALKYL THIAZYL DISULFIDES

Arthur L. Hollis, Akron, Ohio, assignor to The B. F. Goodrich Company, New York, N. Y., a corporation of New York No Drawing. Application August 3, 1948, Serial No. 42,352

3 Claims. (Cl. 106—307)

This invention relates to a new composition of matter and more specifically pertains to a rubber compounding composition comprising alkyl thiazyl disulfides absorbed on pelletized carbon black.

The disulfides obtained by oxidation of 2-mercapto-alkylthiazoles, in general, and more specifically those derived from 2-mercapto-4,5-dimethylthiazole and 2-mercapto-4-ethylthiazole, as well as mixtures of these two disulfides, are excellent accelerators for the vulcanization of rubber. They are delayed action accelerators and are also known to possess the ability to produce vulcanizates having low hysteresis properties. However, such disulfides revert to the corresponding 2-mercaptothiazoles in a relatively short time unless stored under special conditions such as where the storage temperature can be maintained between 45° F. and 90° F. Even when stored under these conditions the disulfides must be used within 60 days of manufacture since appreciable reduction to the mercaptothiazoles occurs thereafter, and the resulting mixture containing both the disulfides and the mercaptothiazoles no longer has delayed action acceleration but instead is scorchy, that is, an unvulcanized rubber composition containing said mixture as an accelerator cures prematurely during milling and mixing.

When the disulfides and the mercaptothiazoles are both solids, reduction of the disulfides to the mercaptothiazoles progresses at a relatively slow rate and is not too objectionable since the mixture of the materials still can be used for some purposes in rubber compounding. But when the disulfide is a liquid, as in the case of the mixed disulfide accelerator containing bis-4,5-dimethylthiazyl disulfide, bis-4-ethylthiazyl disulfide and 4,5-dimethyl-4-ethylthiazyl disulfide, and is packaged in drums and tanks for shipment and storage and stored under the conditions set forth above, reversion to the corresponding solid mercaptothiazoles occurs more rapidly and serious problems arise in handling the resulting mixture. For example, after the liquid is drawn off some of the solid remains in the container and from 10 to 25% of the accelerator remains unused and represents a corresponding loss to the ultimate user. Also, if the mixture of liquid and solid is stirred or agitated and the resulting slurry is drawn off and used as an accelerator, the vulcanization rates and the physical properties of the resulting vulcanizates are quite variable because of the presence of the mercaptothiazoles which cause precuring. Even though only the oily liquid disulfide is drawn off to a measuring container, the amount which is measured out to be used varies appreciably, for, as the temperature of the oily liquid varies, the viscosity of the oily liquid varies and a variable quantity of the oily liquid remains behind in the measuring container. Thus, there are several processing and handling disadvantages encountered in the use of these oily disulfides as accelerators, in addition to the chemical disadvantages caused by reversion to mercaptothiazoles.

I have now discovered that all these disadvantages, attending the use of liquid mixed alkylthiazyl disulfides as accelerator, can be overcome by absorbing the oily liquid disulfides on pelletized carbon black. The resulting product even when containing equal parts by weight of carbon black and thiazyl disulfide is a dry, free-flowing solid material which retains the shape of the pelletized carbon black. This composition of pelletized carbon black and thiazyl disulfides can be packaged in paper sacks and stored under normal storage conditions without any substantial change in chemical composition or physical properties and will retain the properties useful to the compounding and vulcanization of rubber and rubber-like materials for an indefinite period of time. In other words, it has been found, quite surprisingly, that reversion of the disulfides to mercaptothiazoles does not occur to any appreciable extent when the disulfides are absorbed on pelletized carbon black. In addition, the dry, free-flowing solid material is easily and conveniently measurable with no resulting loss of the material by retention in the measuring device used.

The specific oily liquid mixture of alkylthiazyl disulfides with which this invention is particularly concerned is prepared by oxidizing the alkyl thiazoles resulting from the reaction of ammonium dithiocarbamate with commercial chlorinated butanone-2 which contains 3-chlorobutanone-2 and 1-chlorobutanone-2 in the ratio of about 4 parts of the former to 1 part of the latter. Thus, the alkyl thiazoles formed are 4,5-dimethylthiazole and 4-ethylthiazole. A more complete description of the formation of these alkyl thiazoles is found in U. S. Patent No. 2,186,419. When the mixture of alkyl thiazoles containing 4,5-dimethylthiazole and 4-ethylthiazole is oxidized there is formed primarily bis-4,5-dimethylthiazyl disulfide and bis-4-ethylthiazyl disulfide together with some 4,5-diethylthiazyl-4-ethylthiazyl disulfide, i. e., the unsymmetrical alkylthiazyl disulfide formed by the joint oxidation of the two different alkylthiazoles. The resulting mixture of these alkylthiazyl disulfides is an oily liquid containing about 75 to 85% bis-4,5-dimethylthiazyl disulfide, 15 to 20% bis-4-ethylthiazyl disulfide and less than 10% (from 0.1 to 10%) of the unsymmetrical alkylthiazyl disulfide, 4,5 - dimethylthiazyl - 5 - ethylthiazyl disulfide, which would have the formula

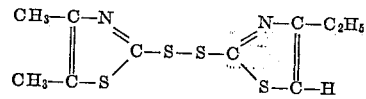

In accordance with this invention compositions comprising pelletized carbon black and alkylthiazyl disulfides are readily and conveniently prepared by merely mixing a quantity of pelletized carbon black with a quantity of the liquid alkylthiazyl disulfide. The mixing of the pelletized carbon black and the oily liquid thiazyl disulfide can be accomplished by employing any type of mixing equipment, but the use of mixing equipment which does not break up the pelletized carbon black is preferred. Thus, internal mixers which have a tolerance or clearance between the mixing blades greater than the diameter of the carbon black pellets are preferably used in preparing these new compositions. The only limitation on the amount of oily thiazyl disulfide which can be combined with the pelletized carbon black is that amount which can be successfully absorbed by the pellets and leave a dry flowable solid. This amount, based on 100 parts by weight of pelletized carbon black, is ordinarily in the range of 42% to 98% of the oil absorption value of the particular carbon black being used. In general, the pelletized carbon blacks will absorb enough of the oily thiazyl disulfides so that the resulting final product can have 50% or more of the oily disulfides by weight.

The best pelletized carbon blacks for the purposes of this invention are the so-called "structure" blacks. The term "structure" applies to the properties of the carbon black particles themselves and not to the properties of the carbon black pellets. Of these structure blacks, the carbon blacks known as "easy processing channel" blacks are preferred, especially the channel blacks having as formed a particle size of from 25 to 35 millimicrons in diameter. The carbon blacks having the above-described properties are formed in spherical pellets of various sizes. In general, the pellet diameter is from about 0.015 inch to about 0.0625 inch. It should be understood, however, that the size of the pellet and the manner in which it is formed is in no way critical in this invention.

The following are specific examples of the preparation and use of the compositions of this invention. In the examples, the parts are by weight.

EXAMPLE I

Fifty parts of pelletized easy processing channel black, a carbon black which is produced by the incomplete combustion of natural gas and enriched natural gas and which has an oil absorption value of 137 ml. per 100 grams and a pH of 5.3 is mixed in an internal mixer with agitation with fifty parts of an oily liquid mixture of alkylthiazyl disulfides containing 75 to 85% bis-4,5-dimethylthiazyl disulfide, 15 to 20% bis-4-ethylthiazyl disulfide and less than 10% of 4,5-dimethyl-4-ethylthiazyl disulfides. The resulting product has the same appearance as the original carbon black pellets, and the product also has the same free flowing characteristics of the original pellets. The product is placed in kraft paper sacks and stored at room temperature. After 145 days of storage there are no oily spots on the bag nor do any appear throughout this period of storage.

Portions of the product prepared above are removed at various times during the storage period and analyzed to determine the degree of reversion of the disulfides to the mercaptothiazoles. The following table shows the results of these chemical analyses. For purposes of comparison, the chemical analyses of the oily liquid mixture of the disulfides is also tabulated.

*Chemical analyses*

| Days Aged | Percent Reversion of Bis-Alkylthiazyl Disulfides to Mercaptothiazoles When Disulfides are Absorbed on Carbon Black Pellets | Percent Reversion of Bis-Alkylthiazyl Disulfides to Mercaptothiazoles When Disulfides are Stored in Liquid Form |
|---|---|---|
| 28 | 0.96 | 9.9 |
| 56 | 0.98 | 13.3 |
| 84 | 0.55 | 15.4 |
| 145 | 1.60 | 21.5 |

The above data clearly demonstrates that the disulfides in the new composition are stabilized by the presence of the carbon black. The following Example II illustrates the change in accelerating activity brought about by aging the liquid bis-alkylthiazyl disulfides described in Example I when used in the unstabilized form (i. e., not absorbed on carbon black).

EXAMPLE II

An oily mixture of the bis-alkylthiazyl disulfides used in Example I is aged 150 days under normal storage conditions and the resulting slurry of liquid oily disulfides and solid mercaptothiazoles is compounded in the proportion of 1 part of the slurry with 100 parts of No. 1 smoked sheet crude rubber, 10 parts of zinc oxide, 3 parts of sulfur, 1 part of age resister, 3 parts of stearic acid, and 51.5 parts of carbon black and vulcanized at 265° F. for 45 minutes. The ultimate tensile strength of the resulting vulcanizate is only 2900 pounds per square inch. A similar composition containing 1 part of the freshly prepared mixed oily disulfide is combined with the same amount of rubber, zinc oxide, sulfur, age resister, stearic acid and carbon black and is heated at 265° C. for 45 minutes. The vulcanizate thus prepared has an ultimate tensile strength of about 4,000 pounds per square inch. Also, the first composition has a tensile strength of 600 to 800 pounds per square inch when heated at 265° F. for 5 minutes while the second composition vulcanized at 265° F. for 5 minutes has an extremely low tensile strength (too low to measure by the commonly used testing machines) which indicates that the slurry of disulfide and mercaptothiazole used as an accelerator in the first composition has very little, if any, delayed action while the disulfide used in the second composition has pronounced delayed action properties.

The following Example III illustrates the use as an accelerator of the stabilized dry free-flowing carbon black pellets which have absorbed an equal weight of the same liquid bis-alkylthiazyl disulfides as described in Example I.

EXAMPLE III

A rubber composition is prepared containing 100 parts of natural crude rubber, 5 parts of zinc oxide, 3 parts of sulfur, 1 part of age resister, 3 parts of softener, 2.5 parts of stearic acid, 49 parts of easy processing channel black and 2 parts of the pellets prepared in Example I which have been aged for 84 days at room temperature. This composition is heated in a press at 290° F. for 30 minutes, which is the optimum curing time for this rubber composition. The resulting vulcanizate has an ultimate tensile strength of 4025 pounds per square inch and an elongation of 595 per cent. For comparison, a similar rubber composition containing 100 parts of natural crude rubber, 5 parts zinc oxide, 3 parts sulfur, 1 part age resister, 3 parts softener, 2.5 parts stearic acid, 50 parts easy processing channel black, and 1 part of freshly prepared unstabilized, oily liquid mixture of the bis-alkylthiazyl disulfides used in preparing the composition of Example I, is heated at 290° F. for 30 minutes. The resulting vulcanizate has an ultimate tensile strength of 4085 pounds per square inch and an elongation of 630 per cent. The retention of the accelerating properties as brought about by the stabilization of the mixed disulfide by absorption on carbon black pellets is apparent from the physical properties of the first vulcanizate as compared with those of the second vulcanizate containing the freshly prepared mixed disulfides. A further indication of this stabilization is demonstrated by the Mooney scorch data for these two rubber compositions. The Mooney scorch value (large rotor at 280° F.) for the first composition is 8.5 minutes and the value for the latter composition is 8.0 minutes. The Mooney scorch value of a similar composition containing 1 part of the slurry of the partially reverted mixed disulfides containing both the disulfides and the solid thiazoles is about 4 to 5 minutes in cases where the oily-liquid mixture of disulfides is stored for the usual period of time.

It is thus apparent that if it were possible to use the previously described oily-liquid mixture of the alkylthiazyl disulfides as soon as it had been prepared or shortly thereafter before reduction of the disulfides to the corresponding mercaptothiazole takes place, there would be no need to resort to any process of stabilization. But, since in industrial practice it is necessary to procure compounding ingredients in advance of the need for the material and since for economic reasons purchases and/or preparation of such materials are made in quantity, it is necessary to store accelerators and other compounding ingredients for considerable periods before use. Thus, by following the teachings of this invention the industrial practices and commercial economics need not be changed in regard to this highly desirable extremely useful oily liquid mixture of alkylthiazyl disulfides. Also, the desirable vulcanization accelerating properties, which have heretofore been fully available only where the disulfide accelerator could be used only where freshly prepared, can now be obtained even after long periods of storage. Furthermore, following the practices of this invention, the undesirable handling properties of even the freshly prepared oily-liquid accelerator are eliminated as herein described. Thus, this invention accomplishes a needed solution for an important industrial problem.

Further advantages in the use of these carbon black bis-alkylthiazyl disulfide compositions is achieved in the handling and measuring of these new compositions. The accelerator can be weighed out and added to the rubber mixture during compounding and milling with the assurance that the desired amount is present in the rubber composition and none is left behind adhering to the container in which the accelerator was weighed. Also, introduction of the accelerator into the rubber composition as a solid instead of a liquid permits a more rapid uniform dispersion in the unvulcanized rubber composition and prevents any appreciable loss during mixing.

Although the above discussion has been mainly concerned with the absorption of the oily liquid mixture of bis-alkylthiazyl disulfides on pellets of channel black and the use of such compositions, it will be understood that pellets of other carbon blacks such as the various furnace blacks may also be used where these blacks are to be employed for reinforcing, pigmenting, loading or filling rubber compositions. The use of these other carbon blacks in a pelletized form will also bring about stabilization of the oily liquid mixture of bis-alkylthiazyl disulfide in essentially the same manner.

The use of high abrasion furnace blacks in the compounding of certain synthetic rubbers is particularly desirable. Acceleration of such rubber compounds with bis-alkylthiazyl disulfides is also quite advantageous, but in some instances a vulcanization retarder is necessary. When the retarder is a liquid or is easily liquefiable, as is the case with certain well known retarders such as N-nitroso diphenylamine and N-nitroso alkylated diphenylamines, it is possible to absorb both the liquid bis-alkylthiazyl disulfide and the liquid retarder in suitable ratio on the pelletized black and thus obtain dry, free-flowing compositions of especial utility in that the disulfide accelerator not only is stabilized, and in an easily handled form, but also is premixed with the desired quantity of vulcanization retarder.

The amount of this oily liquid mixture of alkylthiazyl disulfides to be absorbed by the carbon black pellets depends on the absorption capacity of the pellets and the concentration desired as previously discussed. Concentrations of 10% by weight or less to 50% by weight or more of the oily liquid disulfides based on the total composition will achieve the purposes of this invention. But, for the purposes of computing the amount of the disulfide accelerator to be added to a rubber composition to prepare a vulcanizable mixture, a composition containing 50 parts of carbon black and 50 parts of disulfide accelerator is most satisfactory.

The compositions of this invention can be employed in the compounding of any of the vulcanizable polymeric organic rubber material compositions. For example, in addition to the use of the compositions of this invention with crude natural rubber as described in the examples they may be used with such synthetic rubbery materials as copolymers of butadiene-1,3 hydrocarbons with other unsaturated compounds copolymerizable therewith such as styrene, acrylonitrile, methyl acrylate, methyl methacrylate, chlorostyrenes, vinyl pyridine, and the like.

The use of the compositions of this invention in compounding rubber is not intended to be limited by the above specific examples. For example, they may be employed in proportions other than those illustrated and in fact in any desired proportion consistent with the best practices of compounding and mixing vulcanizable rubber compositions. Thus, where the disulfide accelerator is employed in proportions of 0.25 to 5 parts by weight for each 100 parts by weight of rubber material, it will be necessary to employ 0.5 to 10 parts of a product containing 50% carbon black and 50% disulfide accelerator. Also, the compositions of this invention can be employed together with any of the other compounding ingredients conventionally used in the preparation of rubbery vulcanizable compositions.

I claim:

1. A dry, free-flowing composition consisting of pelletized carbon black on which has been absorbed from 10 to 50% by weight, based on the total composition, of an oily liquid mixture of bis-alkylthiazyl disulfides containing about 75 to 85% bis-4,5-dimethylthiazyl disulfide, about 15 to 20% bis-4-ethylthiazyl disulfide, and less than 10% of 4,5-dimethylthiazyl-4-ethylthiazyl disulfide.

2. A dry, free-flowing composition consisting of a pelletized channel black on which has been absorbed 10 to 50% by weight, based on the total composition, of an oily liquid mixture of bis-alkylthiazyl disulfides containing about 75 to 85% bis-4,5-dimethylthiazyl disulfide, about 15 to 20% bis-4-ethylthiazyl disulfide and less than 10% of 4,5-dimethylthiazyl-4-ethylthiazyl disulfide.

3. A dry, free-flowing composition consisting of 50 parts by weight of pelletized channel black on which has been absorbed 50 parts by weight of the oily liquid mixture of bis-alkylthiazyl disulfides containing about 75 to 85% bis-4,5-dimethylthiazyl disulfide, about 15 to 20% bis-4-ethylthiazyl disulfide and less than 10% of 4,5-dimethylthiazyl-4-ethylthiazyl disulfide.

ARTHUR L. HOLLIS.

No references cited.